(12) United States Patent
Fellingham et al.

(10) Patent No.: US 7,933,393 B1
(45) Date of Patent: *Apr. 26, 2011

(54) METHOD AND APPARATUS FOR SELECTIVE POST-CALL AUDIO LOGO/MESSAGE

(75) Inventors: Paul Fellingham, Middletown, NJ (US); Christopher P. Gilboy, Middletown, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1114 days.

This patent is subject to a terminal disclaimer.

(21) Appl. No.: 11/441,751

(22) Filed: May 26, 2006

Related U.S. Application Data

(63) Continuation of application No. 10/782,182, filed on Feb. 18, 2004, now Pat. No. 7,079,629.

(51) Int. Cl.
*H04M 11/00* (2006.01)
(52) U.S. Cl. .................. 379/114.13; 379/88.16; 379/87
(58) Field of Classification Search .. 379/114.01–114.2, 379/142.04–142.06
See application file for complete search history.

(56) References Cited

U.S. PATENT DOCUMENTS

| | | | | |
|---|---|---|---|---|
| 4,908,849 | A * | 3/1990 | Hashimoto | 379/88.24 |
| 5,463,671 | A * | 10/1995 | Marsh et al. | 379/56.1 |
| 5,539,817 | A * | 7/1996 | Wilkes | 379/230 |
| 6,385,311 | B1 * | 5/2002 | Bauer et al. | 379/201.02 |
| 6,442,244 | B1 * | 8/2002 | Fellingham et al. | 379/76 |
| 6,631,181 | B1 * | 10/2003 | Bates et al. | 379/88.18 |
| 6,647,257 | B2 * | 11/2003 | Owensby | 455/414.1 |
| 6,728,353 | B1 * | 4/2004 | Espejo et al. | 379/114.2 |
| 7,184,541 | B2 * | 2/2007 | Tyagarajan et al. | 379/265.02 |
| 7,535,922 | B1 * | 5/2009 | Potts | 370/465 |
| 2003/0002657 | A1 * | 1/2003 | Seelig et al. | 379/373.01 |
| 2003/0179857 | A1 * | 9/2003 | Conn et al. | 379/1.01 |
| 2003/0235183 | A1 * | 12/2003 | Skelton et al. | 370/352 |

* cited by examiner

*Primary Examiner* — Simon Sing
*Assistant Examiner* — Assad Mohammed

(57) ABSTRACT

A system relays a call from a calling party to a called party and, upon termination of the call by the calling party, a post-call announcement is played to the called party. Attributes of either the calling party, the called party, or both are passed to a database. The database performs a look-up query based on the call attribute information. An announcement indication is transmitted from the database to an announcement frame indicating which post-call announcement, if any, is to be played to the called party. The announcement frame plays the particular post-call announcement, if any, to the called party when the calling party has disconnected from the call.

19 Claims, 1 Drawing Sheet

015
METHOD AND APPARATUS FOR SELECTIVE POST-CALL AUDIO LOGO/MESSAGE

This application is a continuation of U.S. patent application Ser. No. 10/782,182, filed Feb. 18, 2004, entitled "Method and Apparatus for Selective Post-Call Audio Logo/Message", which issued as U.S. Pat. No. 7,079,629 on Jul. 18, 2006.

BACKGROUND OF THE INVENTION

1. Technical Field

The present invention is directed to telephone service providers, and more particularly, but not by way of limitation, to providing post-call announcements to a called party from the telephone service providers.

2. Background of the Invention

Telephone service providers are constantly looking to new ways of advertising new or existing services such as long distance to subscribers. For example, some long distance telephone service providers allow callers the ability to call other subscribers of that same long distance provider for a fixed, monthly fee. The calls are branded with an audio logo so that callers are notified that the cost of the call is free (i.e., included in the fixed monthly fee). While branding the call may alert the calling party that the call is free, this branding message does not reach the called party.

U.S. Pat. No. 6,442,244, herein incorporated in its entirety, describes a system and method for playing an audio logo or announcement to calling party during a telecommunications call. Upon receipt of the call, a switch within a network accesses a service database to determine if the call should receive an audio logo or audible announcements during call set-up. This determination is based on call attribute information such as the calling party number, the dialed number, the carrier identification code, trunk group characteristics, and/or "II" digits; and pre-provisioned data arrays, such as lists of originating numbers, destination numbers, carrier identification codes, trunk group characteristics, and/or II digits that should or should not receive an announcement or announcements. An announcement frame in the switch plays the announcement(s) to the calling party, while the switch simultaneously sets up the call to the called party.

Therefore, there is a need for the ability to deliver a post-call announcement of the service provider to the called party.

SUMMARY OF THE INVENTION

The present invention relates to a method and system of providing a post-call announcement to a called party at the termination of a telephone call. More particularly, one aspect of the present invention relates to a system for providing post-call announcements to a called party. The system comprises a network switch for routing a call to a called party and playing a post-call announcement to the called party, a database storing information for use in determining whether a post-call announcement is to be played to the called party upon termination of the call, and a network for transmitting the call and the post-call announcement to the called party.

In another aspect, the present invention relates to an apparatus for providing post-call announcements to a called party. The apparatus comprises a database for storing information for use in determining whether a post-call announcement is to be played to the called party upon termination of the call, and an announcement frame for playing a particular post-call announcement to the called party. The database returns an announcement number to the announcement frame indicating the particular post-call announcement to be played to the called party.

In another aspect, the present invention relates to a method of providing post-call announcements to a called party. The method comprises the steps of receiving a call request from a calling party to a called party, passing call attribute information to a database, performing a look-up query at the database based on the call attribute information, transmitting an announcement indication to an announcement frame, and routing a call to the called party. The method comprises the additional steps of determining whether or when the calling party has disconnected from the call, and playing a particular post-call announcement, if any, to the called party when the calling party has disconnected from the call.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE INVENTION

The present invention relates to the selective playing of a post-call announcement to a called party at the end of a telephone call, prior to a network of the service provider disconnecting the call. This post-call announcement may be triggered by one or a combination of criteria. For instance, the post-call announcement may be triggered by any combination of a calling party number, a called party number, Carrier Identification Code (CIC) dialed, II-digits, or trunk group characteristics. The CIC is a set of digits that a calling party may dial in order to select a specific long distance carrier for a call. The II-digits are a two digit number that identifies the type of telephone "station" that originated a call. In addition, any knowledge about the called party may also be used as a criterion or trigger. The post-call announcement may be played depending on whether or not the called party is a current customer of the service provider, and if the called party is a current customer, whether or not the called party is subscribed to a specific calling plan (or no plan at all). The post-call announcement may include an advertisement, information, and/or an audio logo from the service provider.

Selectively playing a post-call announcement at the end of a telephone call to the called party has several applications. For instance, providing a post-call announcement to the called party allows the service provider the ability to advertise to the called party, which may not be a current subscriber of the service provider. The post-call announcement may advertise service rates, or data related to receiving more information about a service of the service provider. Although the called party may hang up and therefore not hear the post-call announcement, answering machines or messaging services may record the post-call announcement. The called party may then retrieve the post-call announcement when listening to messages.

Figure 1:
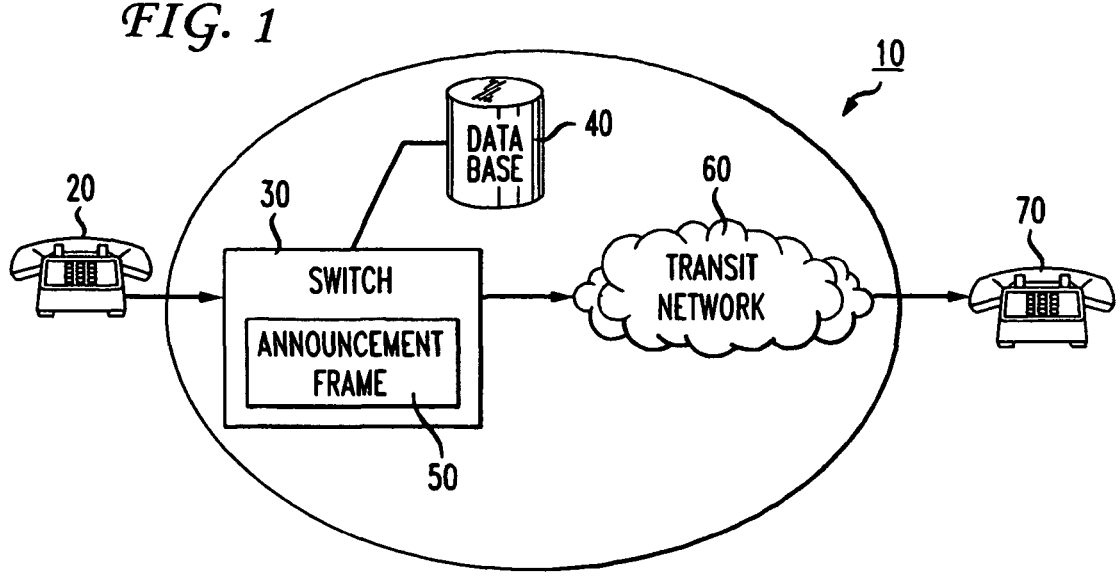
FIG. 1 is a block diagram illustrating an network in which an embodiment of the present invention may be implemented.

Referring now to FIG. 1, an exemplary system 10 for implementing the present invention is illustrated. Calls from a calling party 20 are forwarded by a network switch 30 through a transit network 60 to a called party 70. A database 40 is attached to the network switch 30 and includes information related to service logic, customer data, and/or additional information. Information stored within the database 40 is used to determine which, if any, post-call announcement may be played to the called party 70. The network switch 30 passes information related to the calling party 20 and/or the called party 70 to the database 40. The network switch 30 also includes an announcement frame 50 from which the selected post-call announcement is played. Although the preferred embodiment implements the service logic and customer data as being within the database 40 and the announcement frame 50 is implemented within the network switch 30, other locations for these elements are equally likely in connection with the present invention.

The post-call announcement may be selectively provided in particular instances, for example, when the calling party 20 is not a customer of the service provider or when the calling party 20 is a customer of the service provider but the called party 70 is not. The instances in which a particular post-call announcement is played are related to information within the database 40. For example, the information may include an indication as to whether either the called party 70, the calling party 20, or both are a current subscriber of the service provider. The information may indicate the services to which the calling party 20 and called party 70 subscribe, the type of phone number (e.g., wireless), etc. Based on one parameter or a combination of parameters of the information, as defined for a specific service offering, it is possible that the database 40 can determine whether the post-call announcement feature could apply to a particular call. The post-call announcement to the called party 70 may alert the called party 70 that the call would have been free to the calling party 20 had the called party 70 been a customer of the service provider. It should be noted that an announcement may not be played in some circumstances. For example, called parties that may be ineligible for the service advertised in the post-call announcement are excluded from receiving an announcement by the announcement number "null". Wireless customers are ineligible for certain features of the services provider and therefore a null announcement number may be utilized when the called party is a wireless number. In addition, a dial-around service provider, such as 1010-345, may advertise to the parties called by its customers based on the CIC code used by the calling party 20.

In the preferred embodiment, once the information in the database 40 has been scanned to determine which post-call announcement, if any, may be played to the called party 70, the database 40 returns a feature indicator to the network switch 30. The database 40 also returns an identification of the appropriate post-call announcement to be played to the network switch 30. The feature indicator is used to inform connected systems that a specific feature was applied to the call. For example, the feature indicator may signify that the post-call announcement feature is being applied to the call. The particular post-call announcement may be indicated by an announcement number transmitted to the network switch 30. For example, an announcement number of "null" may be used to indicate that no post-call announcement is played. In another embodiment, the database 40 may keep track of how many times a post-call announcement is played for a given set of selection criteria. By utilizing a counting scheme, the post-call announcement may be played on some, but not necessarily all, calls that match a specific set of criteria. For example, a post-call announcement may be played the first three times a particular set of criteria is met. Although this particular embodiment illustrates that the post-call announcement is played the first three times a particular set of criteria is met, an embodiment may be implemented with an alternate number of times for meeting a set of criteria, e.g., two, four, etc. In yet another embodiment, a terminating switch may notify the database 40 of the outcome of the post-call announcement, i.e., whether the called party 70 was connected for the duration of the announcement. An indication from the terminating switch allows the database 40 to track how often the called party 70 hears the post-call announcement. The determination from the terminating switch may be combined with the ability to provide the post-call announcement on a particular number of calls. For example, for a particular set of criterion, the post-call announcement may be played until it is determined that the called party 70 received the announcement.

Figure 2:
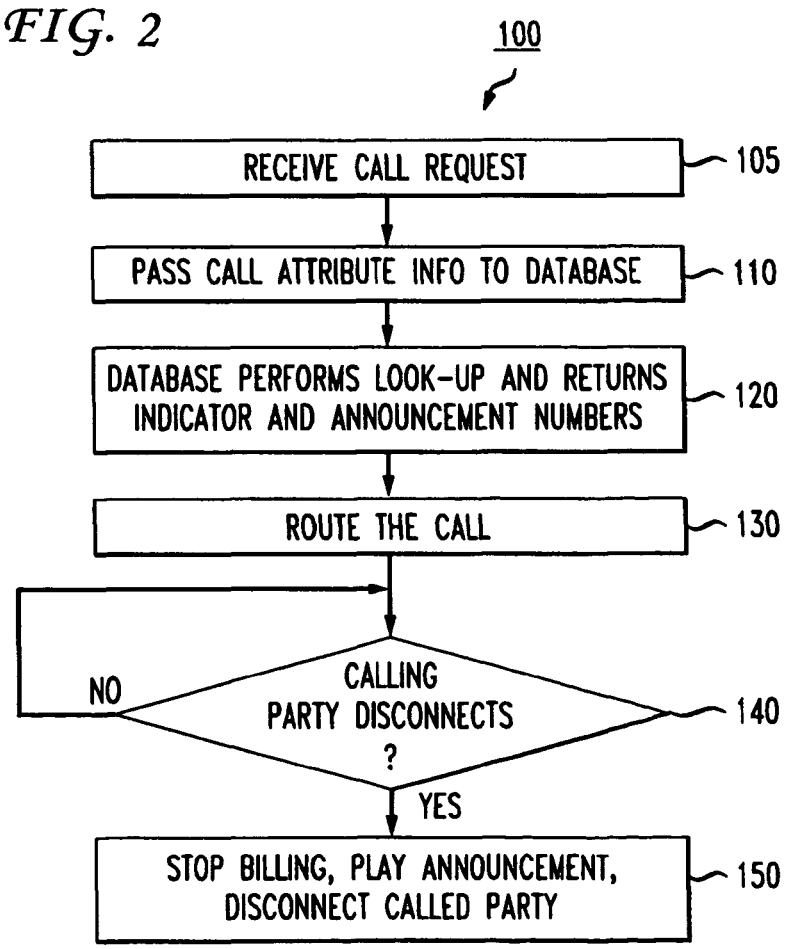
FIG. 2 is a flow diagram illustrating a method of implementing an embodiment of the present invention.

Referring now to FIG. 2, a method 100 of implementing an embodiment of the present invention is illustrated. At step 105, a call request is received from the calling party 20. At step 110, the network switch 30 sends a query to the database 40, along with at least one call attribute (e.g., calling party number called party number, II-digits (Originating Line Information), CIC code, trunk group characteristics, etc.). At step 120, the database 40 performs a look-up based on the call attributes, and examines additional information included in the database 40 regarding the calling party and called party. At step 120, upon receipt of a response, e.g., feature indicator, from the database 40, or after the expiration of a timer in the case of a delayed response, the network switch 30 routes the call through the network to the called party 70. At step 140, the network switch 30 monitors for a disconnect signal. When the calling party 20 disconnects, at step 150, the network switch 30 terminates billing for the call, temporarily suppresses forward disconnect/release signals, plays the selected post-call announcement to the called party 70, then disconnects the called party 70, thereby releasing all resources associated with the call. Since the called party 70 is not immediately released when the calling party 20 hangs up, the service provider ensures that any additional cost resulting from extending the effective call duration to the called party 70 is not charged to the calling party 20, but borne by the service provider.

Although the preferred embodiment has been described as relating to post-call announcements implemented as advertisements of long-distance services, it will be understood that the post-call announcement may relate to any service the provider offers, such as Internet, call waiting, etc.

The previous description is of a preferred embodiment for implementing the invention, and the scope of the invention should not necessarily be limited by this description. The scope of the present invention is instead defined by the following claims.

What is claimed is:

1. A method for providing post-call advertising announcements by a telecommunications service provider to a called party, the method comprising the steps of:
   the telecommunications service provider establishing at least one post-call advertising announcement that is to be played to the called party;
   providing a network switch for routing a call from a calling party to a called party and for playing a post-call advertising announcement to the called party;
   storing in a database call attribute information used for establishing said call and selection criteria established by the telecommunications service provider;
   the telecommunications service provider determining, on the basis of the stored call attribute information used for establishing the call and the selection criteria established by the telecommunications service provider, whether a post-call advertising announcement is to be played to the called party upon termination of the call; and transmitting the call and the indicated post-call advertising announcement to the called party.

2. The method of claim 1 further comprising storing a plurality of post-call advertising announcements in an announcement frame in the network switch, and playing a selected one of the stored post-call advertising announcements to the called party upon termination of the call.

3. The method of claim 2, wherein the database returns to the network switch an indication of a particular post-call advertising announcement to be played.

4. The method of claim 1, further comprising the steps of:
ceasing billing of the calling party once the calling party has disconnected from the call prior to playing the post-call advertising announcement; and
disconnecting the called party from the call.

5. The method of claim 1, wherein the step of routing a call to the called party is performed in parallel with the step of storing of the call attribute information in the database.

6. The method of claim 1, further comprising the steps of:
counting how many times a particular post-call advertising announcement is played for a given set of selection criteria; and
ceasing to play the particular post-call advertising announcement after the particular post-call announcement has been played a predetermined number of times.

7. The method of claim 1, further comprising the steps of determining whether the called party is connected to the network for an entire duration of a particular post-call advertising announcement; and
continuing to play the particular post-call advertising announcement until the called party is connected to the network for the entire duration of the particular post-call advertising announcement.

8. The method of claim 1, wherein transmitting of the advertising announcement is performed by an announcement frame located within the network switch.

9. The method of claim 1, wherein the call attribute information includes at least one of a portion of a calling party number, a portion of a called party number, a portion of a Carrier Identification Code, a trunk group characteristic, and Originating Line Information.

10. The method of claim 1, wherein the call attribute information comprises at least one of: a portion of a called party's calling plan, and a portion of a calling party's calling plan.

11. The method of claim 1, wherein the call attribute information includes at least two of: a calling party number portion, a called party number portion, a Carrier Identification Code, a trunk group characteristic, and Originating Line Information.

12. An apparatus for providing post-call advertising announcements by a telecommunications service provider upon termination of a call to a called party, the apparatus comprising:
a database for storing call attribute information used for establishing said call and selection criteria established by the telecommunications service provider for use in the telecommunication service provider's determination of whether a post-call advertising announcement is to be played to the called party upon termination of the call;
means for the telecommunication service provider's selecting, based on stored call attribute information used for establishing said call, at least one post-call advertising announcement established by the telecommunications service provider to the called party; and
means for playing the selected post-call advertising announcement to the called party upon termination of the call.

13. The apparatus of claim 12, wherein the means for playing comprises an announcement frame and the database maintains a communication connection to the announcement frame.

14. The apparatus of claim 12, wherein the announcement frame is implemented in a network switch.

15. The apparatus of claim 12, wherein the database counts how many times a post-call advertising announcement is played for a given set of selection criteria.

16. The apparatus of claim 13, wherein the announcement frame ceases to play a particular post-call advertising announcement after the particular post-call announcement has been played to the called party a predetermined number of times.

17. The apparatus of claim 12, wherein a terminating switch notifies the database of an outcome of the post-call advertising announcement.

18. The apparatus of claim 17, wherein the outcome relates to whether the called party was connected for the duration of the advertising announcement.

19. The apparatus of claim 17, wherein the playing means is arranged to play a particular post-call advertising announcement until the terminating switch determines that the called party has maintained a connection to the network for the entire duration of the particular post-call advertising announcement.

* * * * *